United States Patent [19]

Day

[11] 4,249,830
[45] Feb. 10, 1981

[54] CONCEALED RELEASABLE FRAME STRUCTURE

[76] Inventor: Robert L. Day, 1518 Grismer St., Burbank, Calif. 91504

[21] Appl. No.: 930,578

[22] Filed: Aug. 3, 1978

[51] Int. Cl.³ .................................................. F16B 7/18
[52] U.S. Cl. ........................................ 403/7; 403/246; 403/297
[58] Field of Search ..................... 403/7, 245, 246, 297

[56] References Cited

U.S. PATENT DOCUMENTS

| | | | |
|---|---|---|---|
| 2,850,304 | 9/1958 | Wagner | 403/297 X |
| 3,051,517 | 8/1962 | Yalen | 403/297 |
| 3,484,830 | 12/1969 | Wagner et al. | 403/297 X |
| 3,514,135 | 5/1970 | Cooper | 403/297 X |
| 3,547,475 | 12/1970 | Gingher | 403/297 |
| 3,797,948 | 3/1974 | Weininger | 403/245 |
| 3,884,588 | 5/1975 | Apple, Sr. | 403/194 |
| 3,977,800 | 8/1976 | Cassel | 403/297 X |

Primary Examiner—Andrew V. Kundrat
Attorney, Agent, or Firm—Flam & Flam

[57] ABSTRACT

Tubular frame structures such as for furniture, cabinets, display stands or the like comprise square tubular metal elements held together by a series of right angle connector structures. The improved connector comprises a channel having one end fixedly attached to a first frame element. A second frame element telescopes over the channel. A jack screw, accessible through a hole in the second frame element, engages a bowed toggle spring to force the sides of the channel apart. Engagement is established at two corners at the ends of one side of the frame while the reaction is sustained by the base of the channel.

4 Claims, 4 Drawing Figures

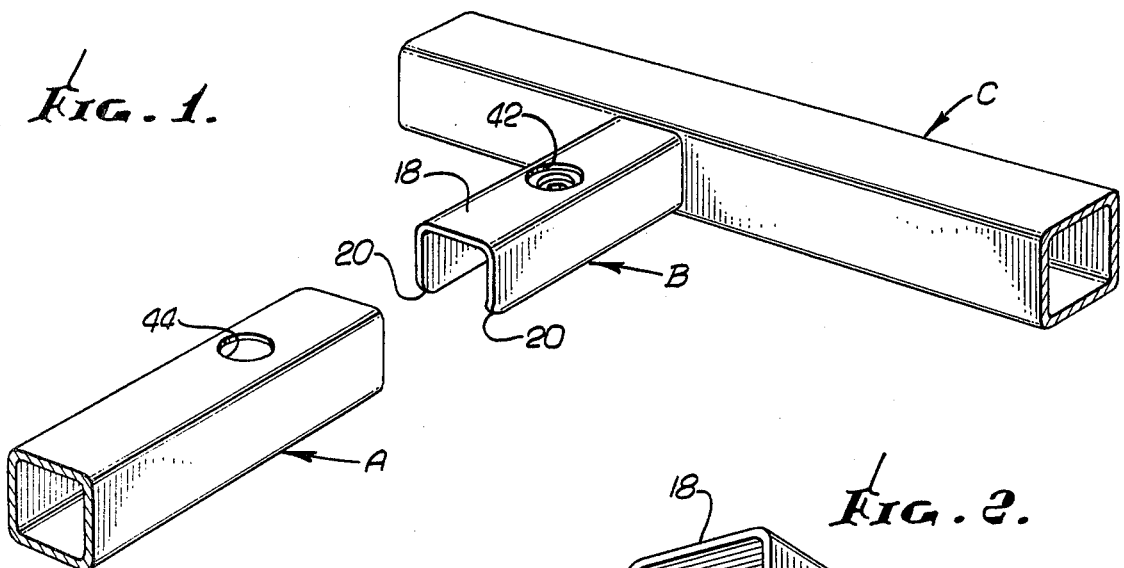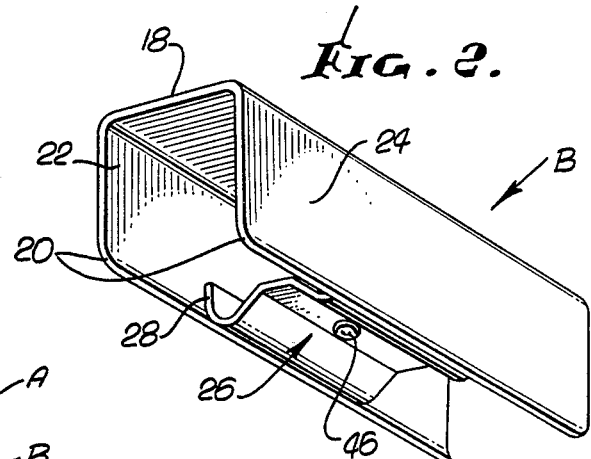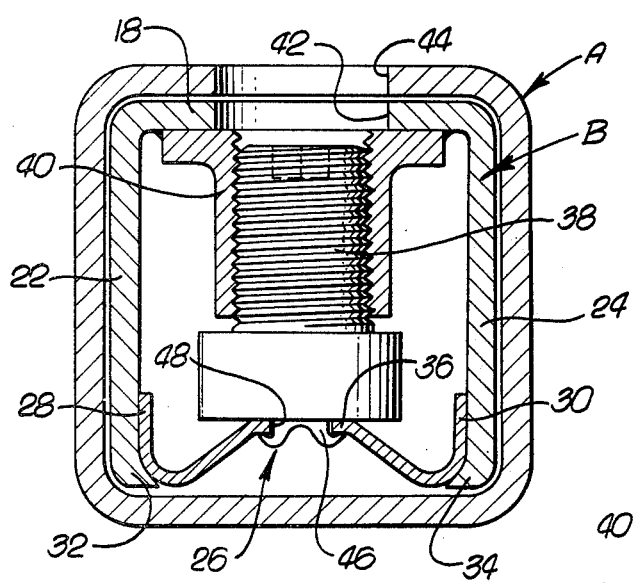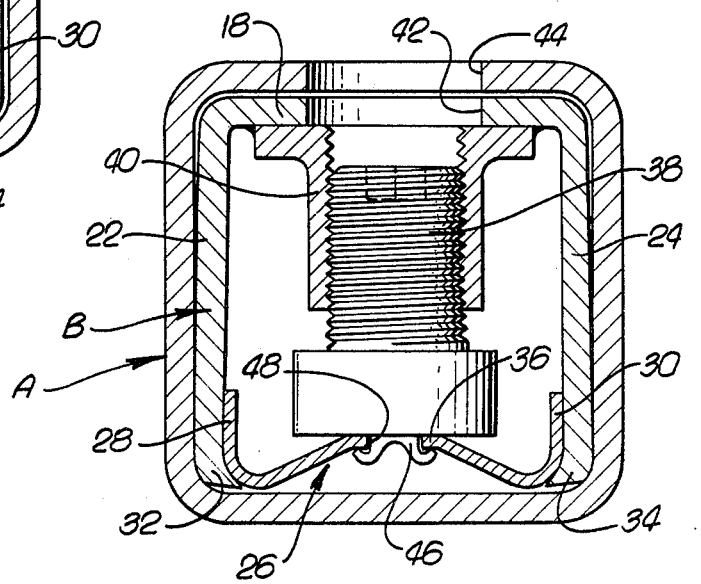

CONCEALED RELEASABLE FRAME STRUCTURE

BACKGROUND OF THE INVENTION

1. Field of Invention

This invention relates to tubular frame structures such as for furniture, cabinets, display stands and the like. More particularly, this invention relates to a releasable connector of the type shown and described in my U.S. Pat Nos. 3,799,685 and 3,603,628 both entitled FRAME CONNECTOR STRUCTURE. Connector structures of this type telescope into the end of a tubular frame element to be neatly concealed thereby.

2. Discussion of the Prior Art

Connector structures of the type shown and described in said U.S. Pat. Nos. 3,799,685 and 3,603,628 are required to provide a rigid and strong connection while the connector itself is neatly concealed. U.S. Pat. No. 3,603,628 illustrates a spring detent arrangement that includes a cam surface on the detent for snugging the parts into full telescopic relationship. A special tool is required to release the connector since the spring force at the detent is very high. A rigid and strong connection depends upon a good close sliding fit between the connector and the frame element. A slight dimensional departure and/or repeated loading and unloading of the structure may cause a very slight but undesirable slack in the connection. If there are several such slack connections, the entire structure loses much of its rigidity.

In U.S. Pat. No. 3,799,685, a friction fit is achieved in such a manner that no localized stress is imposed that would warp the reflective character of the specular finish of the frame element. But the connector has a one-way non-releasable engagement achieved by spring elements that bight into the metal. The arrangement is satisfactory. But the mechanism is relatively complicated and the structure, once assembled, cannot be knocked down.

OBJECTIVES

The object of the present invention is to provide a connector structure that is very simple in construction that achieves a rigid connection and that can later be tightened if any rigidity is lost. Another object of this invention is to provide a connector that achieves a frictional engagement without detracting from the planar reflective character of the frame element. Still another object of this invention is to provide a connector structure that is interchangeable with the connector structure shown and described in U.S. Pat. No. 3,603,628. Yet another object of this invention is to provide a connector structure that is clamped and released by the aid of a simple driver tool, such as an Allen wrench.

SUMMARY OF INVENTION

In order to accomplish the foregoing objectives, I provide a channel attached at one end to one frame element and slidably received by the companion frame element. A toggle member extends across the open end of the channel. The toggle, when extended, flexes the sides of the channel apart for firm frictional engagement with the inside surfaces of the companion frame element. In order to operate the toggle, a thrust member engages the pivot or fulcrum region of the toggle. The thrust member is a screw mounted on the base or central web of the connector and is accessible through a hole in the frame element. The toggle conveniently takes the form of a simple bowed spring steel element, the central portion of which provides its fulcrum or pivot.

BRIEF DESCRIPTION OF THE DRAWINGS

A detailed description of the invention will be made with reference to the accompanying drawings wherein like numerals designate corresponding parts in the several figures. These drawings are true to scale.

FIG. 1 is an exploded fragmentary perspective view of a pair of frame elements to be secured together.

FIG. 2 is a perspective view showing the bottom of the connector.

FIG. 3 is an enlarged cross-sectional view of the assembled connector and frame elements before the connector is locked to the frame element.

FIG. 4 is a view similar to FIG. 3, but showing the connector locked to the frame element.

DETAILED DESCRIPTION OF PREFERRED EMBODIMENT

The following detailed description is of the best presently contemplated mode of carrying out the invention. This description is not to be taken in a limiting sense, but is made merely for purposes of illustrating the general principles of the invention since the scope of the invention is best defined by the appended claims.

A tubular frame element A (FIG. 1) is adapted to be telescoped over a connector B that is, in turn, attached to the second frame element C. The frame elements A and C typically are parts of a furniture item, display stand or the like. The frame elements A and C are made as square flat sided steel tubing provided with chrome plating or specular finish.

The body of the connector B is a spring steel channel 18 sized to fit closely into the end of the frame element A. The corners of the channel sides are rounded at the end, as at 20, to facilitate insertion into the frame element A. The channel 18 has its other end attached to the frame C. In the present instance, the channel is attached to one side of the frame element C. It could be attached at the end to provide the desired framework structure. Optionally, a common corner piece could provide for attachment of a cluster of connectors. In the present instance, the connector B is immovably attached to the frame element. Alternately, a movable pivot connection could be provided for a folding bracket, brace or leg.

The connector channel 18 has sides or flanges 22 and 24 that can be resiliently flexed outwardly for firm frictional engagement with the inside surfaces of the frame element A. For this purpose, a toggle 26 is provided. In the present instance, the toggle 26 takes the form of a one piece spring steel clip shaped as an "M" or "W" configuration. The toggle spring 26 extends across the open side of the channel 18 with its central web bowed inwardly and with its legs 28 and 30 slidable along the insides of the channel. Outward movement of the spring 26 is preferably limited so that the frame element A is not directly engaged. For this purpose, the ends of the channel sides are cupped inwardly as at 32 and 34 to form stops for the spring legs 28 and 30.

The central part of the toggle spring 26 forms a fulcrum or pivot 36. Outward thrust exerted at the pivot 36 causes the spring to move to its outer limit and then to spread the legs 28 and 30 apart, thus flexing the channel into firm frictional contact with the inside surfaces of the frame element A. Since the frictional engagement is over a large area, a large holding force is developed without creating a localized stress. Accordingly, the flat exterior specular surface is not noticeably warped. When the thrust on the toggle spring 26 is removed, the toggle spring releases, freeing the connector body from the frame element A.

In order to move the toggle spring, a thrust member in the form of a jack screw 38 is provided. This screw is mounted by an interiorly threaded collar nut 40. The nut 40 has its flange welded to the inside of the base or web of the channel 18. The web has an opening 42 that registers with an opening 44 of the frame element A whereby the head of the screw 38 is accessible for engagement with a suitable driver, such as an Allen hand wrench. The screw is attached to the spring fulcrum by the aid of a post 46 staked over the fulcrum 36. The connection allows relative rotation of the parts, the post loosely extending through a hole 48 in the fulcrum.

The toggle arrangement provides a substantial mechanical advantage. The screw arrangement also provides a substantial mechanical advantage. The mechanical advantage is therefore compounded so that an efficient machine generates very high clamping forces.

Except for the access opening 44, the connector is entirely concealed. This access opening 44 is sized and placed exactly as is the detent latch opening for the connector shown and described in my U.S. Pat. No. 3,603,628. Accordingly, frame elements for the systems are interchangeable.

A few turns on a driver is sufficient to move the clamp from the released position of FIG. 3 to the clamped position of FIG. 4. If, after a period of time, the frame construction starts to become loose, it is simple to tighten the clamp. The entire assembly and disassembly of the furniture or display item, of which the frame elements A and C form a part, is a simple matter. Elaborate frame structures can be shipped in knocked-down condition and assembled without confounding or confusing any untrained worker assigned the task.

Intending to claim all novel, useful and unobvious features shown or described, I make the following claims:

1. In combination:
   (a) a first tubular frame element of rectangular cross-sectional configuration having a lateral access opening in one side wall adjacent one end of the frame element, said access opening being completely surrounded by the material of said frame element;
   (b) a connector adapted to be mounted at one end to a companion second frame element or the like;
   (c) said connector having a body sized for telescopic insertion into the said one end of said first frame element, said body having a central web paralleling said one side wall of said frame element and having side flanges closely paralleling other opposite side walls of said first frame element, said side flanges being capable of outward resilient flexure toward said other opposite side walls, respectively;
   (d) a toggle spring extending across said connector body with arms positioned to engage the flanges, said toggle spring being angled or bowed inwardly toward said web part, said spring having a central pivot or fulcrum part;
   (e) a thrust member in the form of a jack screw movably mounted by said web part an axially interlocked with said pivot or fulcrum part, and movable to flatten and thereby to extend said toggle spring and to flex said flanges into frictional abutting engagement with the said opposite side walls of said first frame;
   (f) means limiting said jack screw to a range of movement within said web part so that it never projects beyond said web part thereby never to interfere with telescopic movement of said connector relative to said first frame element; and
   (g) said web part having an access opening to the end of said jack screw that registers with the access opening of said first frame element.

2. In combination:
   (a) a hollow frame element of substantially square external configuration having a specular finish and a lateral access opening at one side wall adjacent one end of said frame element, said access opening being completely surrounded by the material of said frame element;
   (b) a channel having one end telescopically received in said hollow frame element and adapted to be mounted at its other end to a companion frame element;
   (c) said channel having a base or web located adjacent and parallel to said one side of said hollow frame element, said channel having side flanges closely paralleling other opposite walls of said hollow frame element, said channel being made of spring material whereby said side flanges of said channel are capable of outward flexure frictionally to engage said other opposite side walls of said hollow frame element;
   (d) a toggle member extending across said channel and having legs engaging said channel side flanges, said legs being angled and extending from a central fulcrum;
   (e) a jack screw movably mounted by said web part and axially interlocked with said fulcrum and movable to flatten said legs and thereby to extend said toggle member to flex said channel flanges;
   (f) means limiting said jack screw to a range of movement within said web so that it never projects beyond said web part thereby never to interfere with telescopic movement of said channel relative to said hollow frame element;
   (g) said web part having an access opening to the end of said jack screw registering with said access opening of said hollow frame element whereby said jack screw may be operated by a suitable tool.

3. The combination as set forth in claim 2 together with an interiorly threaded nut having a base flange welded to the inside of the channel base or web, said nut limiting retracting movement of said jack screw.

4. The combination as set forth in claim 3 in which said jack screw has a post or projection extending through an aperture in said fulcrum whereby said channel, nut, screw and toggle member may be preassembled as a unit prior to attachment to said companion frame element.

* * * * *